United States Patent
Shang et al.

(10) Patent No.: US 8,449,950 B2
(45) Date of Patent: May 28, 2013

(54) IN-SITU DEPOSITION OF BATTERY ACTIVE LITHIUM MATERIALS BY PLASMA SPRAYING

(75) Inventors: Quanyuan Shang, Saratoga, CA (US); Lu Yang, Milpitas, CA (US); Karl M. Brown, San Jose, CA (US); Donald J. K. Olgado, Palo Alto, CA (US); Victor Pebenito, San Jose, CA (US); Hooman Bolandi, San Jose, CA (US); Tetsuya Ishikawa, Saratoga, CA (US); Robert Z. Bachrach, Burlingame, CA (US); Liang-Yuh Chen, Foster City, CA (US)

(73) Assignee: Applied Materials, Inc., Santa Clara, CA (US)

( * ) Notice: Subject to any disclaimer, the term of this patent is extended or adjusted under 35 U.S.C. 154(b) by 190 days.

(21) Appl. No.: 12/862,244

(22) Filed: Aug. 24, 2010

(65) Prior Publication Data
US 2011/0045206 A1    Feb. 24, 2011

Related U.S. Application Data

(60) Provisional application No. 61/236,387, filed on Aug. 24, 2009.

(51) Int. Cl.
| C23C 4/06 | (2006.01) |
| C23C 4/08 | (2006.01) |
| B05D 3/00 | (2006.01) |
| B05D 3/14 | (2006.01) |
| H05H 1/24 | (2006.01) |

(52) U.S. Cl.
USPC ........... 427/576; 427/561; 427/564; 427/451; 427/455

(58) Field of Classification Search
USPC ................ 427/564, 576, 596, 561, 446, 455, 427/451, 450, 447
See application file for complete search history.

(56) References Cited

U.S. PATENT DOCUMENTS

| 6,045,771 A * | 4/2000 | Matsubara et al. ........ 423/594.4 |
| 6,514,640 B1 | 2/2003 | Armand et al. |

(Continued)

FOREIGN PATENT DOCUMENTS

| JP | 8329945 A | 12/1996 |
| JP | 2003217584 A | 7/2003 |

(Continued)

OTHER PUBLICATIONS

Wang, et al.; Plasma spray synthesis of ultra-fine YSZ powder; Journal of Power Sources 170 (2007) pp. 145-149.

(Continued)

*Primary Examiner* — Michael Cleveland
*Assistant Examiner* — Michael Wieczorek
(74) *Attorney, Agent, or Firm* — Patterson & Sheridan, LLP

(57) ABSTRACT

A method and apparatus for forming an electrochemical layer of a thin film battery is provided. A precursor mixture comprising precursor particles dispersed in a carrying medium is activated in an activation chamber by application of an electric field to ionize at least a portion of the precursor mixture. The activated precursor mixture is then mixed with a combustible gas mixture to add thermal energy to the precursor particles, converting them to nanocrystals, which deposit on a substrate. A second precursor may be blended with the nanocrystals as they deposit on the surface to enhance adhesion and conductivity.

11 Claims, 8 Drawing Sheets

U.S. PATENT DOCUMENTS

| | | | |
|---|---|---|---|
| 6,838,072 B1 * | 1/2005 | Kong et al. | 423/594.2 |
| 6,863,699 B1 | 3/2005 | Krasnov et al. | |
| 7,112,758 B2 | 9/2006 | Ma et al. | |
| 7,338,734 B2 * | 3/2008 | Chiang et al. | 429/221 |
| 7,491,469 B2 | 2/2009 | Guidotti et al. | |
| 7,521,097 B2 | 4/2009 | Horne et al. | |
| 7,713,662 B2 | 5/2010 | Tabuchi et al. | |
| 2002/0192137 A1 | 12/2002 | Chaloner-Gill et al. | |
| 2005/0260494 A1 | 11/2005 | Huang et al. | |
| 2006/0134347 A1 | 6/2006 | Chiruvolu et al. | |
| 2007/0051634 A1 * | 3/2007 | Poole et al. | 205/109 |
| 2008/0280189 A1 | 11/2008 | Kesler et al. | |
| 2008/0311306 A1 | 12/2008 | Xiao et al. | |
| 2009/0013522 A1 | 1/2009 | Honda et al. | |
| 2009/0117465 A1 | 5/2009 | Tokunaga et al. | |
| 2009/0217512 A1 | 9/2009 | Tian et al. | |

FOREIGN PATENT DOCUMENTS

| | | |
|---|---|---|
| JP | 2009062256 A | 3/2009 |
| JP | 2009302044 A | 12/2009 |
| WO | WO-2009023744 A1 | 2/2009 |

OTHER PUBLICATIONS

Ye, et al.; Novel Design and Fabrication of Thermal Battery Cathodes Using Thermal Spray; Mat. Res. Soc. Symp. Proc. vol. 548 (1999) pp. 701-707.

International Search Report mailed May 2, 2011, in PCT application PCT/US2010/046498.

International Search Report and Written Opinion of the International Searching Authority mailed Apr. 27, 2011 in PCT/US2010/046501.

\* cited by examiner

US 8,449,950 B2

IN-SITU DEPOSITION OF BATTERY ACTIVE LITHIUM MATERIALS BY PLASMA SPRAYING

CROSS-REFERENCE TO RELATED APPLICATIONS

This application claims benefit of U.S. Provisional Patent Application 61/236,387, filed Aug. 24, 2009, which is incorporated by reference herein.

FIELD

Embodiments of the present invention relate generally to lithium-ion batteries, and more specifically, to a method of fabricating such batteries using thin-film deposition processes.

BACKGROUND

Fast-charging, high-capacity energy storage devices, such as supercapacitors and lithium (Li) ion batteries, are used in a growing number of applications, including portable electronics, medical devices, transportation, grid-connected large energy storage, renewable energy storage, and uninterruptible power supplies (UPS). In modern rechargeable energy storage devices, the current collector is made of an electric conductor. Examples of materials for the positive current collector (the cathode) include aluminum, stainless steel, and nickel. Examples of materials for the negative current collector (the anode) include copper (Cu), stainless steel, and nickel (Ni). Such collectors can be in the form of a foil, a film, or a thin plate, having a thickness that generally ranges from about 6 to 50 µm.

A typical lithium ion battery consists of a carbon anode and a lithium metal oxide or phosphate cathode separated by an electrolyte liquid consisting of a lithium salt such as $LiPF_5$, $LiBF_4$, or $LiClO_4$ in an organic solvent such as ethylene carbonate, or by a solid polymer electrolyte, such as polyethylene oxide, complexed with lithium salts and/or filled with liquid electrolytes. The cathode material is typically selected from lithium transition metal oxides, such as $LiMn_2O_4$, $LiCoO_2$, $LiNiO_2$, or combinations of Ni, Li, Mn, and Co oxides and includes electroconductive particles, such as carbon or graphite, and binder material. The cathode material is considered to be a lithium-intercalation compound, in which the quantity of conductive material is in the range from about 0.1% to about 15% by weight. The cathode material may be applied to a conductive sheet electrode as a paste and compacted between hot rollers, or sprayed on as a solution or slurry, and the resulting substrate dried to remove the liquid carrier.

Graphite is frequently used as the anode material and can be in the form of a lithium-intercalation meso-carbon micro bead (MCMB) powder made up of MCMBs having a diameter of approximately 10 µm. The lithium-intercalation MCMB powder is dispersed in a polymeric binder matrix. The polymers for the binder matrix are made of thermoplastic polymers including polymers with rubber elasticity. The polymeric binder serves to bind together the MCMB material powders to preclude crack formation and prevent disintegration of the MCMB powder on the surface of the current collector. The quantity of polymeric binder is in the range of about 0.5% to about 15% by weight. The polymer/MCMB mixture may be applied as a paste and compacted between hot rollers, or in a liquid solution, and the resulting substrate dried to remove the solvent.

Some Li-ion batteries use separators made from microporous polyolefin polymer, such as polyethylene foam, which are applied in a separate manufacturing step. The separator is generally filled with a liquid electrolyte, as described above, to form the finished battery.

As the use of thin-film Li-ion batteries continues to grow, there is an ongoing need for thin-film Li-ion batteries that are smaller, lighter, and can be more cost effectively manufactured.

SUMMARY

Embodiments described herein provide a method of forming a layer on a substrate by providing a first precursor to a processing chamber, coupling energy into the first precursor to form an activated precursor, directing the activated precursor toward the substrate, blending the activated precursor with a second precursor to form a deposition mixture, and depositing a layer comprising nanocrystals formed from the activated precursor on the substrate.

Other embodiments provide an apparatus for forming an electrochemical film on a substrate, the apparatus having a processing chamber enclosing a substrate support and a dispenser, the dispenser comprising an activation chamber in fluid communication with a precursor source, a source of electric power coupled to the activation chamber, a mixing region in fluid communication with the activation chamber, the mixing region having an exit oriented toward the substrate support, and a first conduit having an opening disposed near the substrate support and spaced apart from the mixing region.

Other embodiments provide an apparatus for forming an electrochemical film on a conductive surface of a substrate, the apparatus having a continuously moving substrate conveyor, and a dispenser disposed above the substrate conveyor, the dispenser comprising an activation chamber with a plurality of nozzles extending toward the substrate conveyor and oriented in a direction perpendicular to the direction of motion of the substrate conveyor, the activation chamber in fluid communication with one or more sources of electrochemical precursors, a source of electric power coupled to the activation chamber, an annular conduit disposed around each nozzle for carrying a combustible gas mixture to a mixing zone at the end of each nozzle, and a plurality of heads disposed near the substrate conveyor and spaced apart from the plurality of nozzles, each head extending from a conduit for dispensing a second precursor.

Other embodiments provide a method of forming a layer on a substrate by providing a precursor mixture comprising an electrochemical precursor and an oxygen containing precursor to a processing chamber, forming a plasma from the precursor mixture, reacting the electrochemical precursor and the oxygen containing precursor in the plasma to form electrochemically active nanocrystals, and depositing the electrochemically active nanocrystals on a substrate.

Other embodiments provide a method of forming an electrochemical layer on a substrate by forming a precursor solution comprising lithium, oxygen, and carbon, atomizing the precursor solution in an inert gas, flowing the atomized precursor and a carbon containing gas mixture into a plasma chamber, coupling DC voltage to the plasma chamber to form a plasma from the atomized precursor and the carbon containing gas, reacting the atomized precursor to form nanocrystals of an electrochemically active material, flowing the nanocrystals in a stream out of the plasma chamber toward the substrate, adding a polymer binder to the stream to form a deposition mixture, and depositing the deposition mixture on the substrate.

Other embodiments provide an apparatus for forming an electrochemical film on a substrate, the apparatus having a processing chamber enclosing a substrate support and a dispenser, the dispenser having an activation chamber in fluid communication with a precursor source, a source of electric power coupled to the activation chamber, a mixing region in fluid communication with the activation chamber, the mixing region having an exit oriented toward the substrate support, and a first conduit having an opening disposed near the substrate support and spaced apart from the dispenser.

Other embodiments provide an apparatus for forming an electrochemical film on a conductive surface of a substrate, the apparatus having a continuously moving substrate conveyor, and a dispenser disposed above the substrate conveyor, the dispenser having an activation chamber with a plurality of nozzles extending toward the substrate conveyor and oriented in a direction perpendicular to the direction of motion of the substrate conveyor, the activation chamber in fluid communication with one or more sources of electrochemical precursors, a source of electric power coupled to the activation chamber, an annular conduit disposed around each nozzle for carrying a combustible gas mixture to a mixing zone at the end of each nozzle, and a plurality of heads disposed near the substrate conveyor and spaced apart from the plurality of nozzles, each head extending from a conduit for dispensing a second precursor.

BRIEF DESCRIPTION OF THE DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments disclosed herein generally provide methods and apparatus for forming a film on a substrate. In one embodiment, the film may be an electrochemical film for a thin-film battery, such as a Li-ion battery, or supercapacitor device. An electrochemical precursor or mixture of electrochemical precursors is provided to a processing chamber, where energy is applied to bring the precursor or precursor mixture to a high-temperature state. The high temperature converts the electrochemical precursors into electrochemically active nanocrystals, which form a layer or film on the substrate surface.

Figure 1:
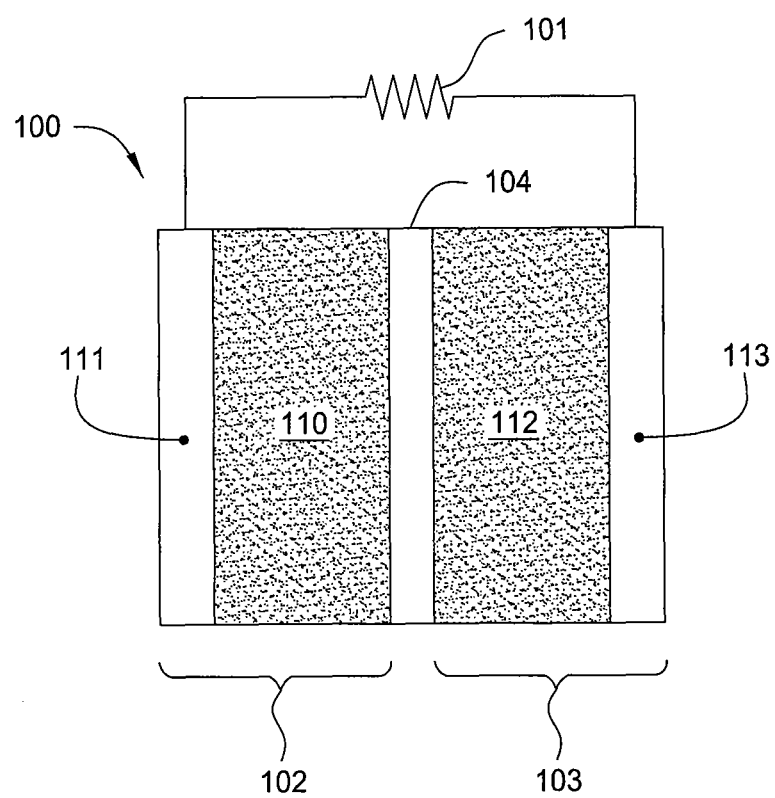
FIG. 1 is a schematic diagram of a Li-ion battery according to one embodiment.

FIG. 1 is a schematic diagram of a Li-ion battery 100 electrically connected to a load 101, according to an embodiment of the invention. The primary functional components of Li-ion battery 100 include an anode structure 102, a cathode structure 103, a separator layer 104, and an electrolyte (not shown) disposed within the region between the opposing current collectors 111 and 113. A variety of materials may be used as the electrolyte, such as a lithium salt in an organic solvent or a polymeric matrix, which may also be permeated by an organic solvent. The electrolyte is present in anode structure 102, cathode structure 103, and a separator layer 104 in the region formed between the current collectors 111 and 113.

Anode structure 102 and cathode structure 103 each serve as a half-cell of Li-ion battery 100, and together form a complete working cell of Li-ion battery 100. Anode structure 102 includes a current collector 111 and a first electrolyte containing material 110, such as a carbon-based intercalation host material for retaining lithium ions. Similarly, cathode structure 103 includes a current collector 113 and a second electrolyte containing material 112, such as a metal oxide, for retaining lithium ions. The current collectors 111 and 113 are made of electrically conductive material such as metals. In some cases, a separator layer 104, which may be a dielectric, porous, fluid-permeable layer, may be used to prevent direct electrical contact between the components in the anode structure 102 and the cathode structure 103.

The electrochemically active material on the cathode side of the Li-ion battery 100, or positive electrode, may comprise a lithium-containing metal oxide, such as lithium cobalt dioxide ($LiCoO_2$) or lithium manganese dioxide ($LiMnO_2$). The electrolyte containing material may be made from an oxide like lithium cobalt oxide, an olivine like lithium iron phosphate, or a spinel like lithium manganese oxide ($LiMn_2O_4$), formed in a layer on the positive electrode. In non-lithium embodiments, an exemplary cathode may be made from $TiS_2$ (titanium disulfide). Exemplary lithium-containing oxides may be one or more layers of lithium cobalt oxide, or mixed metal oxide, such as $LiNi_xCo_{1-x-y}Mn_yO_2$, $LiMn_2O_4$. Exemplary phosphates may be iron olivine ($LiFePO_4$) and it is variants (such as $[Li_xFe_{1-x}]_yMgPO_4$), $LiMoPO_4$, $LiCoPO_4$, $Li_3V_2(PO_4)_3$, $LiVOPO_4$, $LiMP_2O_7$, or $LiFe_{1.5}P_2O_7$. Exemplary fluorophosphates may be $LiVPO_4F$, $LiAlPO_4F$, $Li_5V(PO_4)_2F_2$, $Li_5Cr(PO_4)_2F_2$, $Li_2CoPO_4F$, or $Li_2NiPO_4F$. Exemplary silicates may be $Li_2FeSiO_4$, $Li_2MnSiO_4$, or $Li_2VOSiO_4$. An exemplary non-lithium compound is $Na_5V_2(PO_4)_2F_3$.

The electrochemically active material on the anode side of the Li-ion battery 100, or negative electrode, may be made from materials described above, namely graphitic microbeads dispersed in a polymer matrix. Additionally, microbeads of silicon, tin, or lithium titanate ($Li_4Ti_5O_{12}$) may be used with, or instead of, graphitic microbeads to provide the conductive core anode material.

Figure 2:
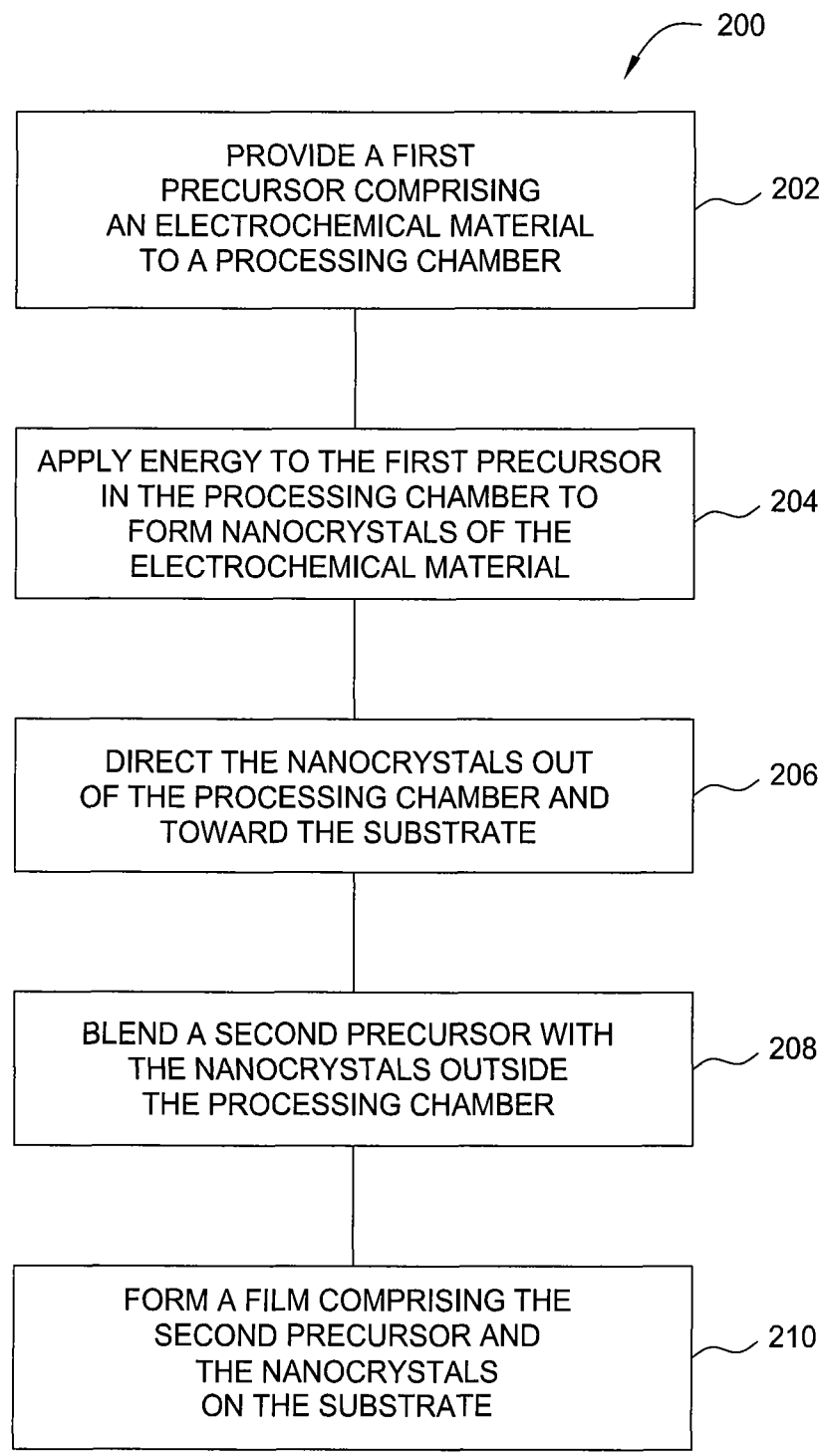
FIG. 2 is a flow diagram summarizing a method according to one embodiment.

FIG. 2 is a flow diagram summarizing a method 200 according to one embodiment. The method 200 is useful for forming a layer of an electrochemical agent, such as the electrochemically active materials, cathode and/or anode materials described above, on a substrate. The substrate may have a surface that comprises a conductive current collector for a battery structure, as described above with respect to FIG. 1. For example, the substrate may have a copper or aluminum electrode surface. At 202, a first precursor is provided to a processing chamber such as the activation chamber 308 of FIG. 3, further described below, through a conduit. The processing chamber may be a chamber of a dispenser, such as the dispensers 406 and 504 of FIGS. 4 and 5A, respectively. The first precursor comprises one or more electrochemical precursors in a solution, suspension, or slurry. The suspension or slurry may feature nanoparticles of an electrochemically active material having a diameter between about 1 nm and about 100 nm dispersed in a carrying medium. The solution may comprise metal salts or other metal solutes dissolved in an oxygen containing liquid. A layer containing the electrochemical material formed on the surface of a substrate will be referred to below as the deposited layer. In one embodiment, the carrying medium may be a liquid that is atomized by co-flowing with an inert gas such as argon, helium, or nitrogen through a small opening at high velocity before entering the processing chamber. Components of the carrying medium may also nucleate around the electrochemical nanoparticles to reduce attachment to the walls of the processing chamber. Suitable liquid carrying media include water and organic liquids such as alcohols or hydrocarbons. The alcohols or hydrocarbons will generally have low viscosity, such as about 10 cP or less at a temperature between about 20° C. and about 50° C., to afford reasonable atomization.

At 204, energy is applied to the first precursor to add energy to the precursor material to form an activated precursor, which is used to form nanocrystals on the surface of the substrate. The energy excites thermal motion of atoms in the particles dispersed in the first precursor, causing them to move to preferentially find lower energy crystal lattice positions as the deposited layer is formed on the surface of the substrate. In one embodiment, the energy is applied by coupling an electric field into the first precursor, for example, by applying an RF varying voltage to the processing chamber. In another embodiment, the energy may be a combination of electrical and thermal energy. In some embodiments, the energy may be applied in two phases. For example, electrical energy may be applied in a first phase to activate at least a portion of the first precursor. The activated precursor may then be subjected to thermal energy in a second phase. In some embodiments, portions of the energy may be applied at power levels sufficient to form a plasma containing the first precursor.

In some embodiments, it may be advantageous to use carbon containing substances, such as carbon containing electrolyte materials, in the process of forming the deposited layer. Carbon can act as a binder for the deposited layer, and the conductivity of carbon improves film performance. Adding carbon through the carrying medium may also prevent vaporization of the electrochemical material particles during processing. Carbon may be added to the reaction mixture by flowing a carbon containing gas into the processing chamber. Hydrocarbons such as methane ($CH_4$) or acetylene ($C_2H_2$) may be used in some embodiments. The carbon containing gas is activated in the processing chamber and polymerizes to form low molecular weight amorphous carbon particles that may coat the nanoparticles formed in the chamber.

Oxygen may also be added in a controlled amount to form a reactive mixture in the processing chamber. Activated oxygen and carbon react, adding thermal energy to the chamber, if desired, to facilitate forming nanocrystals in the chamber. The reactive mixture usually comprises a stoichiometric excess of carbon to form the carbon particles for deposition on the substrate. Excess carbon also provides a reducing environment that prevents or retards oxidation of metals in the nanoparticles and precursors. Carbon containing precursors may be added as part of the first precursor, for example blended with the atomizing gas prior to atomization of the first precursor, or may be added separately to the processing chamber. Oxygen is usually added to the processing chamber in a separate stream to avoid producing a combustible mixture.

The residence time of particles in the processing chamber and mixing region, and the heat transfer rate into the particles, are adapted to crystallize the particles without vaporizing them and to control particle size and particle size distribution. The residence time of particles in the processing chamber is also adapted to provide a suitable deposition rate on the substrate. The heat transfer rate into the particles may be influenced by the particular combustible mixture used and heat capacity of the components in the precursor material. For example, higher hydrocarbons, conjugated hydrocarbons, or cooler burning partially oxidized fuels such as alcohols, may be used to afford heat input at a slower rate, if desired. Additionally, use of a carrying medium with a higher viscosity to form a thicker covering over the particles, or use of a carrying medium with lower thermal conductivity, may reduce heat input into the particles. A carrying medium, such as water, with a high latent heat will also control heat input into the particles.

At 206, the nanocrystals formed by applying energy to the first precursor are directed out of the processing chamber and toward a substrate in a stream to form a film on the substrate. The nanocrystals may be spread according to any desired pattern by engineering the precise flow pattern and movement of the processing chamber relative to the substrate surface, and the geometry of the portal through which the nanocrystal stream exits the processing chamber or dispenser.

At 208, a second precursor is blended with the nanocrystals outside the processing chamber as the stream moves toward the substrate. The second precursor is generally provided to facilitate binding the activated precursor to the substrate. The second precursor may comprise a binding agent, such as a polymer, to hold the nanocrystals on the surface of the substrate. The binding agent will typically have some electrical conductivity to avoid diminishing the performance of the deposited layer. In one embodiment, the binding agent is a carbon containing polymer having a low molecular weight provided at a ratio of less than about 100 polymer molecules per nanocrystal. The low molecular weight polymer may have a weight average molecular weight of less than about 3,000,000 g/mol to promote adhesion of the nanoparticles to the substrate. The ratio of polymer molecules to nanocrystals provides space between the crystals and promotes adhesion without hindering a substantially free flow of electrons and ions through the deposited layer.

At 210 the nanocrystals and the binding agent are formed in the deposited layer on the substrate. A minimal quantity of binding agent occupies interstices between the nanocrystals to adhere them to the film while allowing free flow of electrons and ions through the deposited layer. In some embodiments, the substrate may be heated during formation of the film to encourage close settling of the nanocrystals before the binding agent, and any residual carbon deposited with the nanocrystals, hardens. Close settling of the nanocrystals is promoted by subsequent collision of nanocrystals emerging from the processing chamber so long as the binding medium has not become too resistant to movement.

In some embodiments, a shell may be formed between each nanocrystal and its coating prior to depositing the nanocrystals on the substrate. The shell may be formed by providing an electrochemical precursor with composition different from the first precursor described above to the processing chamber or the mixing region, or both. The material provided to form the shell is generally an electrochemical material desirous of crystallization, so the shell material is generally provided at a location that is adjacent to, or overlaps with, the reactive zone that forms nanocrystals from the first precursor. For example, the shell material may be mixed with the stream of nanocrystals exiting the activation chamber to expose the shell material to the thermal energy of the nanocrystal stream, crystallizing the shell material around the newly formed nanocrystals prior to deposition on the substrate. In another example, the shell material may be separately activated using a separate activation chamber, and then mixed with the nanocrystal stream exiting the dispenser.

In one example, a shell material may be provided to cover a high capacity, low stability, electrochemical core with a high stability shell to prevent reactions between the core and the electrolyte. A high capacity core may be an electrochemical mixture having elevated nickel content, whereas a high stability shell may have lower nickel content. The high nickel content of the core may undergo chemical reactions with some electrolyte materials. Forming a shell of lower nickel content around the high capacity core preserves the capacity of the core while preventing such chemical reactions.

Porosity of the deposited film may be controlled by adjusting the speed with which nanocrystals exit the dispenser apparatus. Increasing the speed generally lowers the porosity of the film. Size of the nanocrystals is controlled by degree of atomization. Finer atomization, for example by increasing pressure of the atomizing gas, results in smaller particles.

Figure 3:
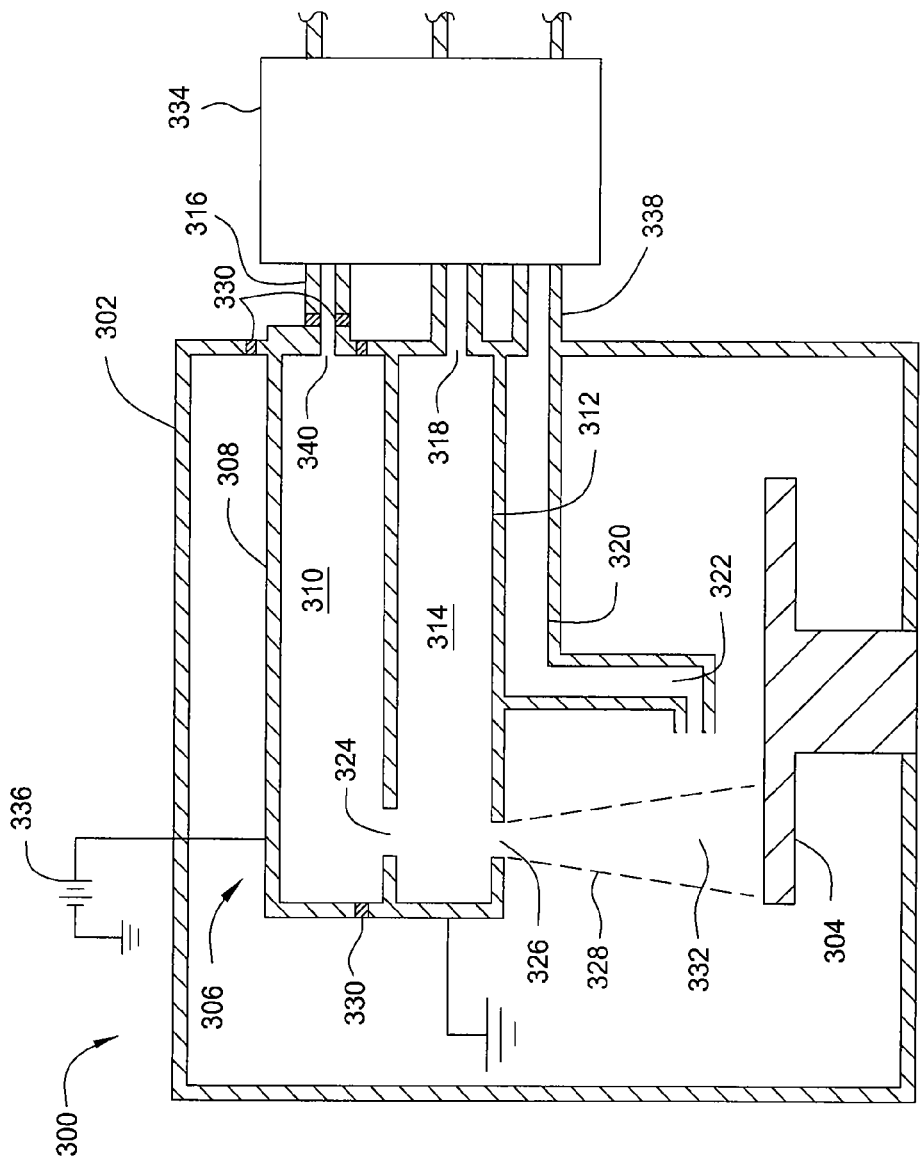
FIG. 3 is a schematic cross-sectional view of a film formation apparatus according to one embodiment.

FIG. 3 is a schematic cross-sectional view of a processing chamber 300 according to one embodiment. The processing chamber 300 comprises an enclosure 302, a substrate support 304, and a dispenser 306 for providing an activated material 328 towards a substrate disposed on the substrate support 304. The dispenser 306, which may be a distributor that dispenses nanocrystals according to a desired pattern, comprises an activation chamber 308 for activating a first precursor, a mixing chamber 312 for mixing the first precursor with a second precursor, and a conduit 320 for providing a third precursor. The activation chamber 308 has an interior portion 310 in fluid communication with a first source conduit 316 for providing a first precursor to the interior portion 310. The mixing chamber 312 has an interior portion 314 in fluid communication with a second source conduit 318 for providing a second precursor to the interior portion 314.

The first precursor in the activation chamber 308 is exposed to an electric field coupled into an interior portion 310 of the activation chamber 308 by a source of electric energy 336. Although shown in the embodiment of FIG. 3 as a DC source, the electric source 336 may be an RF or DC source. Electrical insulators 330 may be disposed in the walls of the dispenser 306 to confine the electric energy to the activation chamber 308.

In some embodiments, the first precursor is provided to the activation chamber 308 as a liquid atomized into the chamber through an opening 338. An atomizing gas is blended with the first precursor in the conduit 316 and flowed at a high velocity through the opening 338 to atomize the first precursor in the activation chamber. In one embodiment, the first precursor comprises an aqueous solution of electrochemical precursors blended with carbon and oxygen containing fluids, and optionally containing carbon containing solutes dissolved therein. The atomizing gas may be a plasma-maintaining gas such as argon, helium, nitrogen, hydrogen, or a mixture thereof. The plasma-maintaining gas promotes activation of the atomized first precursor, producing metal ions such as $Li^+$, $Ni^{2+}$, $Mn^{2+}$, and $Co^{2+}$, to the extent such metals are present in the first precursor. The metal ions react with activated oxygen species to form the electrochemically active lithium metal oxide nanocrystals to be deposited on the substrate.

A first opening 324 allows the precursor to flow under pressure from the activation chamber 308 to the mixing chamber 312. The mixing chamber 312 has an interior portion 314 in fluid communication with the activation chamber 308 and a second source conduit 318 for providing a second precursor to the mixing chamber 312. The second precursor may be a carbon containing mixture selected to add carbon to the deposited layer. Oxygen may also be added to the second precursor to add thermal energy to the reaction in the mixing chamber, if needed to complete the nanocrystallization process. In some embodiments, temperature may be high enough in the activation chamber 308, for example above about 900° C., to complete the nanocrystallization process, which is a thermal crystallization process. In other embodiments, the nanocrystallization process may be completed in the mixing chamber. Active species and nanocrystals from the activation chamber 308 flow through the first opening 324 under pressure and mix with the carbon containing mixture in the mixing chamber 312. The nanocrystal stream exits the mixing chamber 312 through a second opening 326 in a spray pattern 332 that travels to the substrate support 304 and any substrate disposed thereon.

The mixture that exits the dispenser 306 through the second opening 326 comprises a nanocrystal stream 328 to be deposited on a substrate. The stream 328 may contain water vapor, carbon monoxide and carbon dioxide, and trace quantities of vaporized electrochemical materials, such as metals. At least some of the nanocrystals may also be partially or fully coated with carbon containing material such as amorphous carbon, which may be derived from reactions of various carbon containing materials in the first and second precursors. In one embodiment, the stream 328 comprises a non-reactive carrier gas component, such as argon (Ar) or nitrogen ($N_2$) that is used to help deliver the nanocrystals to the substrate surface.

The conduit 320 is configured to provide a third precursor to be mixed with the nanocrystal stream traveling to the substrate surface. The third precursor may be a binding agent, a filler, and/or a conductivity enhancer. In some embodiments, the third precursor is a sprayable polymer, which may be a polymer solution or slurry, provided near the point of contact between the activated material and the substrate surface. The conduit 320 is in fluid communication with a third source conduit 338.

The three source conduits 316, 318, and 338 emerge from a flow controller 334, which controls the flow of the various precursors used to form the deposited layer. In one mode, a plasma spraying operation may be performed using the apparatus of FIG. 3 by disposing a substrate on the substrate support 304 and establishing a flow of the atomizing gas into the activation chamber 308. The electric source 336 is energized to form a plasma from the atomizing gas. Flow of the electrochemical precursor is then started at a low flow rate and ramped up to a target flow rate. Power to the electric source 336 may be ramped up as the activation chamber 308 is loaded so that the plasma is maintained. Flow of the second precursor into the mixing chamber 312 is then established. When the nanocrystal stream 328 is established, flow of the third precursor through the conduit 322 is established.

Figure 4:
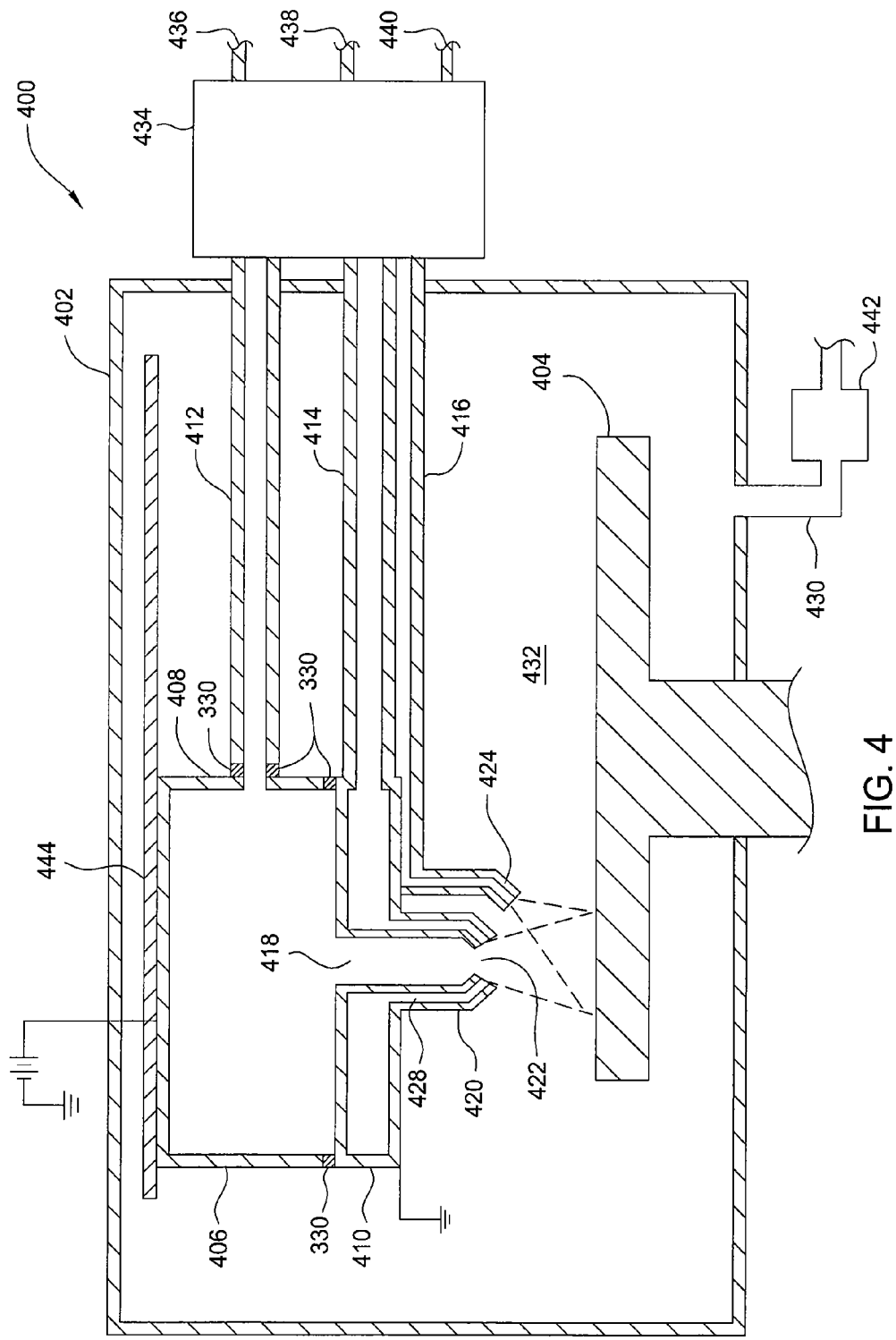
FIG. 4 is a schematic cross-sectional view of a film formation apparatus according to another embodiment.

In one embodiment, the activation chamber comprises a nozzle through which the activated precursor exits into the mixing region. FIG. 4 is a schematic cross-sectional view of an apparatus 400 according to another embodiment. The apparatus 400 comprises a processing chamber 402, substrate support 404, and a dispenser 406, which in some embodiments may be a distributor that dispenses material according to certain desired patterns.

The dispenser 406 comprises an activation chamber 408 and a nozzle 420, though which the activated precursor mixture exits the dispenser 406. A first precursor mixture is provided to the activation chamber 408 through a first source conduit 436 in fluid communication with a precursor source (not shown), which may feature an atomizer for liquid, slurry, or suspension precursors. The first source conduit 436 delivers the first precursor mixture to a flow controller 434, which controls flow of the first precursor through a first precursor delivery conduit 412 into the activation chamber 408. The nozzle 420 carries the activated first precursor mixture from the activation chamber 408 through opening 418 to a mixing zone 422 near the end of the nozzle 420.

The mixing zone 422 may be an enclosure adjacent to the activation chamber 408 or a confined space configured to direct the gas mixture toward the substrate in a desired pattern as the mixture reacts. In one example, a second precursor, which may comprise carbon, oxygen, or both, is provided through an annular pathway 428 around the nozzle 420. The annular pathway 428 is configured to flow the second precursor into the activated first precursor in a uniform manner as it exits the nozzle 420. As the precursor streams mix, active species in the first precursor may react with components of the second precursor, generating heat to facilitate the nanocrystallization process, and pressure to propel the activated material outward in a stream of nanocrystals having a spread pattern. The precise geometry of the nozzle 420 and the mixing zone 422 may be adjusted to achieve any desired flow pattern or mixing method. The exact method of mixing devised may help control heat transfer into the nanocrystals. For example, a mixing method incorporating vortex flow of the first and second precursors may be useful in controlling application of heat from the mixing zone reactions, which may include combustion reactions, to the nanocrystals.

The second precursor is delivered to the mixing zone 422 by a second precursor source conduit 438 in fluid communication with a second precursor source (not shown). The second precursor flows through the flow controller 434 into a second precursor delivery conduit 414 to the annular pathway 428.

A third precursor may be delivered through a third precursor delivery conduit 416 flowing from a third precursor source conduit 440, in fluid communication with a third precursor source (not shown), through the flow controller 434. The third conduit 424 may have a distribution head configured to distribute the third precursor in a pattern that substantially overlaps the pattern of impact on the substrate by the nanocrystal stream, such that the nanocrystals are secured to the substrate by the third precursor.

In the apparatus of FIG. 4, the dispenser 406 moves with respect to the substrate support 404 to form a film over all, or a substantial portion of, a substrate disposed on the substrate support 404. This may be accomplished by moving the dispenser 406, the substrate support 404, or both. For example, the dispenser 406 may be configured to extend and retract across the chamber 402 using an actuator. Alternately, or in addition, the substrate support 404 may have a positioning mechanism, such as a precision x-y stage, schematically represented at 444.

Exhaust gases leave the chamber 402 through an exhaust portal 430, which may have any convenient configuration. The portal 430 may be a single opening in a wall of the chamber 402, as shown in FIG. 4, or multiple such openings, or a circumferential exhaust channel disposed around a circumference of the chamber 402. The exhaust portal 430 comprises a particle trap 442 to prevent particles generated by the dispenser 406 from reaching vacuum pumps and other processing equipment downstream of the chamber 402. The particle trap 442 may be any suitable device, such as a filter or vortex separator.

Figure 5A:
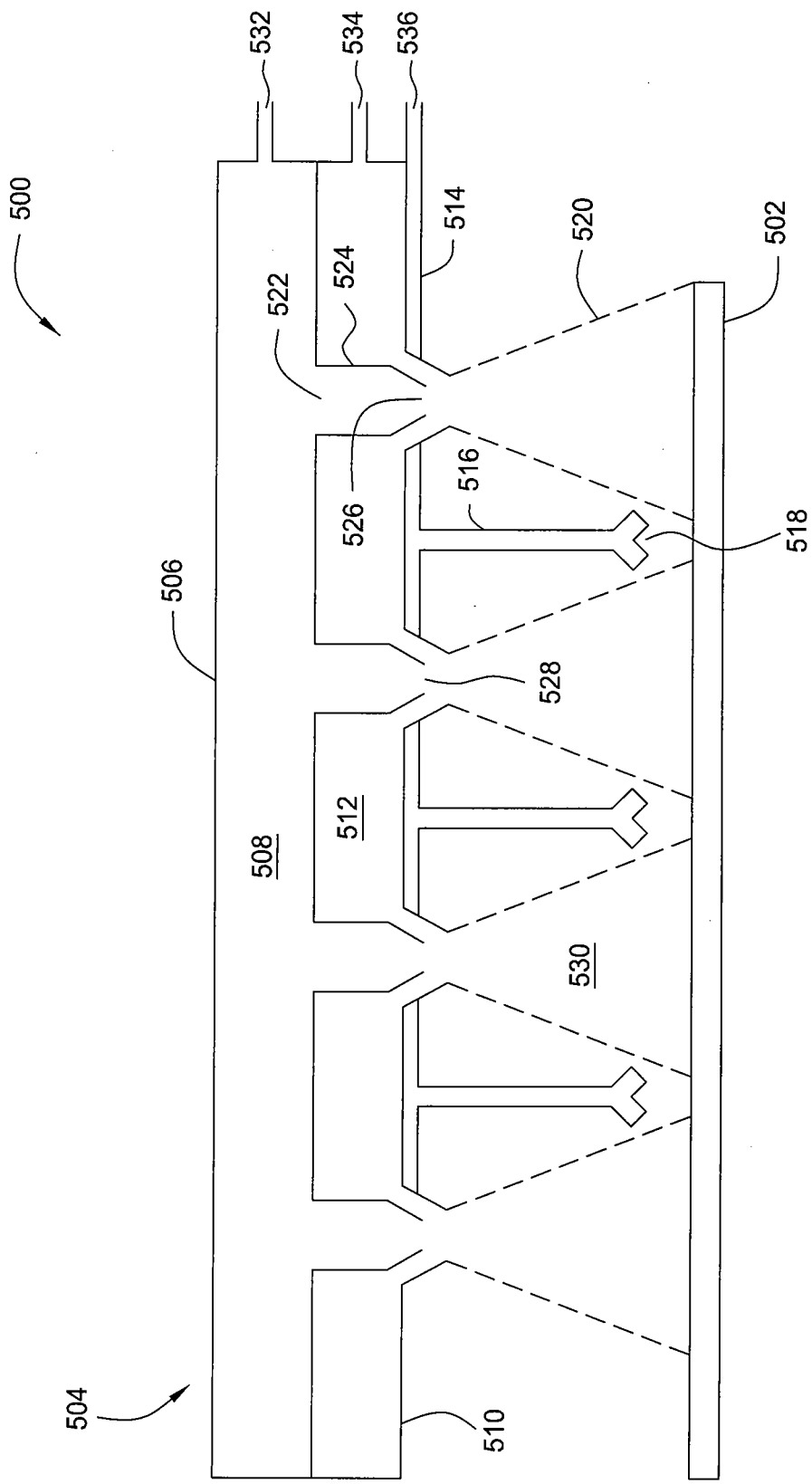
FIG. 5A is a schematic cross-sectional view of a film formation apparatus according to another embodiment.

FIG. 5A is a schematic cross-sectional view of an apparatus 500 according to another embodiment. Like the apparatus of FIGS. 3 and 4, the apparatus 500 comprises a dispenser 504 and a substrate support 502 (the processing chamber enclosure is not shown in FIG. 5A). In the apparatus of FIG. 5A, the dispenser 504 comprises a plurality of nozzles 524 in fluid communication with an interior portion 508 of an activation chamber 506. A deposition precursor, such as those described above, containing electrochemical material to be deposited on a substrate is provided through a conduit 532 in fluid communication with one or more sources of deposition precursors, which may feature an atomizer for liquid precursors. Activation may be performed as shown in FIGS. 3 and 4, using an electric field generator (not shown) coupled to a wall of the activation chamber 506. Isolators may be used as in other embodiments described herein to control and isolate the electric field to the activation chamber 506, if desired.

The activated material exits the activation chamber 506 through first openings 522 into nozzles 524, and then through second openings 526 into mixing regions 528 formed outside each nozzle 524. A carbon containing precursor, which may also contain oxygen, may be provided to the mixing regions 528 through the nozzles 524 using conduit 534 in fluid communication with gas chamber 512 and a carbon source. As described in connection with other embodiments discussed herein, reactions in the mixing regions cause the activated material to propagate toward the substrate 502 in spray patterns 530. In one configuration, precursor metals in the activated material react with active oxygen species to form electrochemically active metal oxides, which crystallize to form nanocrystals prior to depositing on the surface of the substrate. The spray patterns 530 are shaped by the nozzle geometry and speed of gas flow to cover substantial portions of a substrate disposed on the substrate support 502. A third precursor, similar to that described above, is provided through conduit 536, which is in fluid communication with portals 518 and one or more sources of the third precursor. The configuration of the portals 518 is designed to blend the second precursor with the activated material stream as it propagates toward the substrate 502 in the spray patterns 530, causing components, such as nanocrystals to be formed and/or bind to the substrate 502 as they impact thereon.

In some embodiments, all precursor materials including carbon containing materials and binders may be fed to an activation chamber such as 308 in FIG. 3, 408 in FIGS. 4, and 508 in FIG. 5 in a single atomized stream for concerted activation and reaction. Inert gas may be provided to the mixing chamber 312, or the mixing zones 422 and 528 to prevent back flow through the conduits communicating with those zones.

Figure 5B:
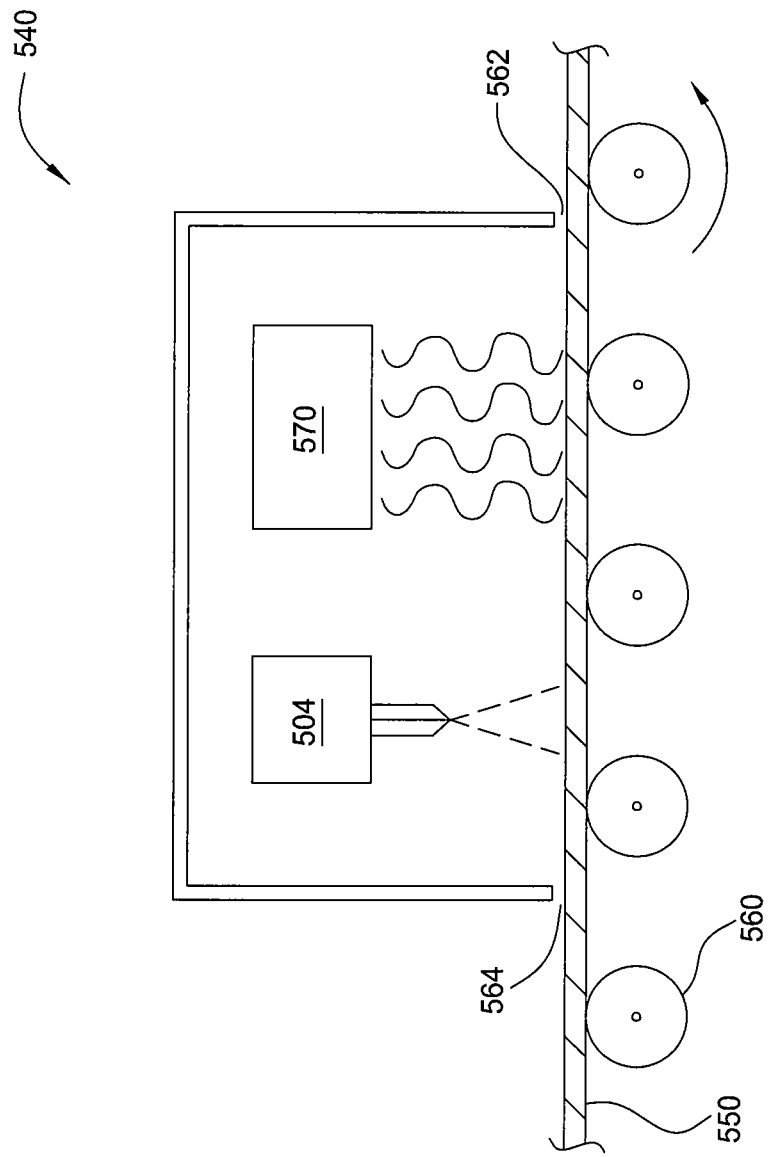
FIG. 5B is a schematic side view of a film formation apparatus according to another embodiment.

A dispenser with multiple nozzles such as the dispenser 504 may be configured with all nozzles in a linear configuration, or in any other convenient configuration. To achieve full coverage of a planar substrate, the dispenser may be translated across the substrate while spraying activated material, or the substrate may be translated beneath the dispenser, or both, according to methods similar to that described above. FIG. 5B is a schematic side view of an apparatus 540 configured to translate a substrate along a conveyor 550 through a processing chamber having the dispenser 504 disposed across the travel path of the conveyor 550. A substrate enters the chamber through a first opening 562 and travels beneath a preheater 570, which heats the substrate to a target temperature selected to enhance formation of the electrochemical film by enhancing adhesion of the deposited layer to the substrate. The multiple nozzles of the dispenser 504 are oriented across the path of the substrate to cover the substrate uniformly as it travels beneath the dispenser. The conveyor generally moves by virtue of horizontal actuators such as the schematically represented rollers 560 of FIG. 5B. The substrate, having been covered with the electrochemical film, exits the chamber through a second opening 564 for further processing.

Figure 5C:
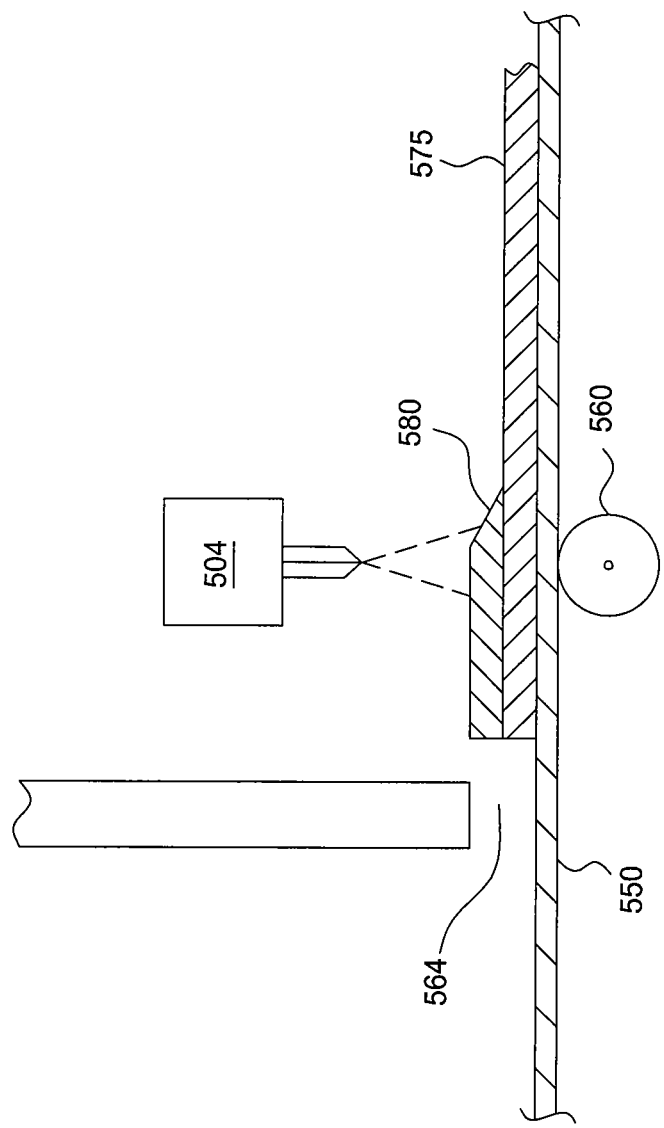
FIG. 5C is a close-up view of the apparatus of FIG. 5A.

FIG. 5C is a close-up view of the apparatus of FIG. 5A, with a substrate 575 disposed on the conveyor 550 for processing. As the substrate 575 is carried toward the second opening 564, the dispenser 504 dispenses material to form a deposited layer 580 on the substrate 575. As the substrate 575 travels beneath the dispenser 504, the deposited layer 580 grows from one edge of the substrate 575 to the other.

Figure 5D:
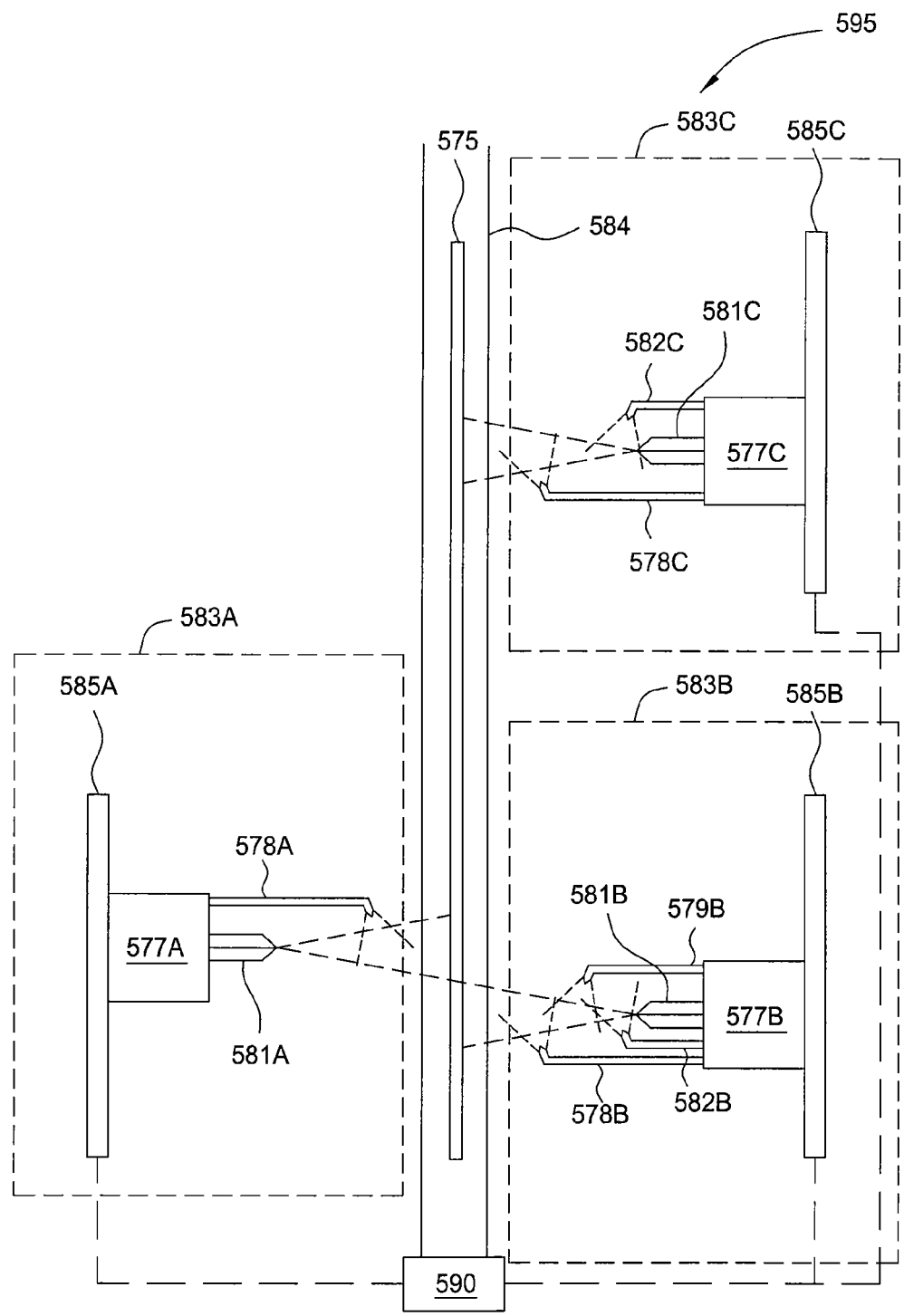
FIG. 5D is a schematic plan view of an apparatus according to another embodiment.

FIG. 5D is a schematic plan view of an apparatus 595 according to another embodiment. The apparatus 595 features a plurality of processing stations 583A-C, with a conveyance 584 for conveying a substrate 575 along the processing stations 583A-C. Each of the processing stations 583A-C has a dispenser 577 in an orientation facing the conveyance 584, and a substrate 575 thereon. Each of the dispensers generally conforms to the description of the dispenser 406 of FIG. 4, with certain optional variations. Each dispenser 577 has a main nozzle 581 for dispensing a stream of nanocrystals. Each dispenser 577 is shown with a first auxiliary nozzle 578, which may be for dispensing a binder material, positioned at a first distance from the main nozzle 581. Each of the dispensers 577B and 577C has a second auxiliary nozzle 578B and 578C, respectively, which may be used for dispensing a coating or a shell, as described above, and which are positioned a second distance from the main nozzle 581. The dispenser 577B additionally has a third auxiliary nozzle 579B positioned a third distance from the main nozzle 581 for dispensing a coating material in addition to a shell material.

The processing stations 583 of FIG. 5D are shown disposed on opposite sides of the conveyance 584 for simultaneous or concurrent processing of two major surfaces of a substrate. Additionally, the processing stations 583B and 583C are shown in a sequential arrangement on one side of the conveyance 584 for sequential processing of the substrate 575. Such sequential processing enables layers of different materials to be applied sequentially to the substrate. For example, the processing station 583B may form a high capacity electrochemical layer on the substrate 575 by providing a shell material through the second auxiliary nozzle 582B, a coating material through the third auxiliary nozzle 579B and a binder material through the first auxiliary nozzle 578B. Then the processing station 583C may form a high stability electrochemical layer over the high capacity electrochemical layer, if desired, using the second auxiliary nozzle 582C to apply a coating material and the first auxiliary nozzle 578C to dispense a binder material.

In this way, successive layers having different composition may be formed on the substrate. In some embodiments, each of the processing stations 583 may have a plurality of dispensers 577 arranged along a line perpendicular to the direction of movement of the substrate 575 but parallel to the plane formed by the major surfaces of the substrate 575. Such an arrangement of dispensers at each processing station may enable each processing station to cover the substrate uniformly as it passes through the processing station. It should be noted that the dispensers 583A-C are shown having different nozzle configurations for illustration purposes. Some embodiments may have a plurality of identical dispensers, while others have different based on the desired films.

The orientation and location of the various nozzles in the apparatus 595 may be varied to control aspects of the deposited film. The mixing location of the various auxiliary nozzles into the nanocrystal stream may be changed by adjusting the distance of the auxiliary nozzles from the dispenser. Mixing characteristics may be changed by adjusting the exit speed of material from the auxiliary nozzle and the angle of the auxiliary nozzle with respect to the nanocrystal stream. The auxiliary nozzles may be arranged proximate the nanocrystal stream in any convenient arrangement, and the number of nozzles may be varied. Additionally, dispensers configured in a manner similar to the dispensers 577 of FIG. 5D may be disposed over a substrate supported in a horizontal configuration, for example on a conveyor such as the conveyor 55 of FIGS. 5B and 5C.

In one embodiment, a layer of electrochemically active material is deposited on a substrate in a plasma spray operation. An electrochemical precursor material comprising Li, Mn, Ni, and Co in a vapor form or a liquid form, such as a slurry or solution, is exposed to plasma energy to form a stream of electrochemically active nanocrystals that deposit on the substrate. The plasma energy generates ions of $Li^+$, $Mn^{2+}$, $Ni^{2+}$, and $Co^{2+}$ from the slurry or solution. A solution of $LiNO_3$, $Ni(NO_3)_2$, $Mn(NO_3)_2$, and $Co(NO_3)_2$ may be formed by mixing a 1 molar (M) $LiNO_3$ solution with a 1M solution of each of the other nitrates in water. A slight excess of Li precursor, such as between about 5% excess and about 15% excess, for example about 10% excess, may be used to improve performance of the deposited layer. For example, 330 mL of the 1M $LiNO_3$ may be mixed with 100 mL of each of the other 1M solutions to form an aqueous base stock. Other salts, such as organic salts, of lithium, nickel, manganese, and/or cobalt may be used instead of, or in addition to, the nitrates. In one embodiment, one or more carboxylates of any or all the above metals, for example formates, acetates, or tartrates may be used Carbon is added by mixing in an organic compound, which may be a solvent, comprising oxygen and hydrogen, or a sugar, all of which dissolve in, or are miscible with, water. Isopropyl alcohol, ethylene glycol, propylene glycol are examples of organic solvents that may be used. Sucrose is an exemplary sugar. The precursor mixture may be between about 80% and about 100% by weight of the aqueous base stock, between about 0% and about 17% organic solvent, and between about 0% and about 5% sugar by weight. An exemplary electrochemical precursor contains 85% aqueous base stock, 10% isopropyl alcohol, and 5% sugar.

The precursor mixture is flowed into a processing chamber at a flow rate between about 5 mL/min and about 100 mL/min, for example about 50 mL/min, and DC energy is coupled to the chamber at a voltage between about 150V and 250V and a power level between about 35 kW and about 100 kW, for example about 65 kW, to form a plasma from the precursor mixture. The precursor mixture is atomized with a carrier gas such as nitrogen gas ($N_2$), hydrogen gas ($H_2$), helium (He), argon (Ar), or a mixture thereof, at a pressure between about 10 psi and about 30 psi. A relatively inert ambient is maintained in the process chamber to control exposure of the electrochemically active materials to oxygen.

A carbon containing gas, which may be a hydrocarbon such as methane, ethane, acetylene, propane, or another fuel, may be added to the precursor mixture, for example by mixing with the atomizing gas, or separately provided to the process chamber to add carbon to the mixture, if desired. The carbon containing gas may add additional carbon above that in the precursor mixture, or all carbon may be added through the carbon containing gas. Oxygen may be mixed with the carbon containing gas to provide a more energetic reaction. Total carbon content of the deposited film may be controlled by adjusting a flow rate of the carbon containing gas, the carbon components of the electrochemical precursor, or both. Reaction temperature may also be controlled by adjusting the flow rate of the carbon containing gas and/or oxygen provided therewith. A hydrogen containing carrier gas may also be used to control temperature in the chamber. The temperature in the processing chamber is typically maintained between about 600° C. and about 2,000° C., such as between about 800° C. and about 1,600° C., for example about 900° C.

The precursor mixture reacts to form nanocrystals of an electrochemically active material having the general formula $LiNi_wMn_xCo_yO_z$, wherein w, x, and y are each between about 0.3 and 1.5 and z is between about 1.5 and 2.5. The plasma is ejected from the processing chamber, with the nanocrystals entrained in a stream of hot gas and plasma. In one embodiment, the nanocrystals exit the processing chamber at a velocity of between about 100 m/sec and about 600 m/sec., such as about 100 m/sec. the stream forming a plasma jet having a length between about 0.1 and 1.5 m, such as about 1 m. The substrate is generally positioned between about 0.1 and 1.5 m from the plasma chamber.

A binder is provided with the precursor mixture or injected into the nanocrystal stream exiting the processing chamber. The binder is typically a polymer that facilitates adhesion of the nanocrystals to the substrate, and may also provide some desirable electrical properties in some embodiments. The binder is typically provided as a liquid, for example a solution, suspension, or emulsion. In one embodiment, the binder is a modified styrene-butadiene rubber ("SBR") material in a water emulsion sprayed into the nanocrystal stream exiting the processing chamber. In another embodiment, the binder is a water soluble polymer such as polyacrylic acid blended with the aqueous precursor mixture Flow rate of the binder precursor is generally between about 10% and about 75%, for example about 30%, of the flow rate of the electrochemical precursor to the processing chamber.

If the binder is mixed in with the stream of nanocrystals, the mixing location is selected for its energy content. The residual heat in the nanocrystal stream vaporizes the solvent or continuous phase of the liquid, freeing the binder to contact the nanocrystals. In most such cases, the binder is provided at a distance from the processing chamber that is between about 60% and about 90% of the distance from the processing chamber to the substrate, for example between about 70% and about 80%.

The composition of the electrochemical precursor may be changed to change the composition of the deposited electrochemically active layer. To make a spinel material such as $LiMn_2O_4$, for example, the electrochemical precursor may be made using 100 mL of 1M $LiNO_3$ solution and 200 mL of 1M $Mn(NO_3)_2$ solution, with appropriate amounts of oxygen containing materials. A high capacity layer may be formed by depositing a lithium based material rich in nickel, for example about 60% nickel by weight, or more. Conversely, a high stability layer may be formed by depositing a lithium based material relatively low in nickel, for example less than about 40% nickel by weight. Materials rich in nickel are less stable because the nickel tends to react with many electrolytes used in battery formulations. As described above, this tendency may be controlled by forming a high stability shell around a high capacity core.

In alternate embodiments, nanocrystals may be coated with materials other than carbon. Thin coatings of alumina, aluminum fluoride, aluminum phosphate, aluminum hydroxide, may be used. Aluminum may be added to the process as aluminum alkyls, for example trimethylaluminum. Fluorine may be added as HF. Phosphorus may be added as phosphine, $PH_3$.

While the foregoing is directed to embodiments of the invention, other and further embodiments of the invention may be devised without departing from the basic scope thereof.

What is claimed is:

1. A method of forming a layer on a substrate, comprising:
   providing a precursor mixture comprising an electrochemical precursor and an oxygen containing precursor to a processing chamber;
   forming a plasma from the precursor mixture;
   reacting the electrochemical precursor and the oxygen containing precursor in the plasma to form electrochemically active nanocrystals; and
   depositing the electrochemically active nanocrystals on a substrate, and further comprising flowing the nanocrystals out of the processing chamber toward the substrate in a stream, and adding a binder to the stream.

2. The method of claim 1, wherein the binder is a polymer, and adding the binder to the stream comprises forming an emulsion of the polymer in water and mixing the emulsion with the stream at a location selected to vaporize the water.

3. A method of forming a layer on a substrate, comprising:
   providing a precursor mixture comprising an electrochemical precursor and an oxygen containing precursor to a processing chamber;
   forming a plasma from the precursor mixture;
   reacting the electrochemical precursor and the oxygen containing precursor in the plasma to form electrochemically active nanocrystals; and
   depositing the electrochemically active nanocrystals on a substrate, wherein the electrochemical precursor is a solution comprising lithium nitrate, nickel nitrate, magnesium nitrate, and cobalt nitrate, mixed with an organic oxygen containing fluid, the solution is atomized to form the plasma, a carbon containing gas is added to the plasma, the nanocrystals are ejected from the processing chamber in a stream, and a flow rate of the carbon containing gas is adjusted to control a temperature of the stream, and further comprising adding a mixture of a polymer and water to the stream of nanocrystals at a location selected to vaporize the water.

4. A method of forming an electrochemical layer on a substrate, comprising:
   forming a precursor solution comprising lithium, oxygen, and carbon;
   atomizing the precursor solution in an inert gas;
   flowing the atomized precursor and a carbon containing gas mixture into a plasma chamber;
   coupling DC voltage to the plasma chamber to form a plasma from the atomized precursor and the carbon containing gas;
   reacting the atomized precursor to form nanocrystals of an electrochemically active material;
   flowing the nanocrystals in a stream out of the plasma chamber toward the substrate;
   adding a polymer binder to the stream to form a deposition mixture; and
   depositing the deposition mixture on the substrate.

5. The method of claim 4, wherein the precursor solution further comprises nickel, magnesium, and cobalt.

6. The method of claim 4, wherein the precursor solution is an aqueous solution comprising lithium and an organic compound.

7. The method of claim 6, wherein the aqueous solution comprises lithium nitrate, nickel nitrate, magnesium nitrate, and cobalt nitrate.

8. The method of claim 7, further comprising altering a composition of the electrochemical layer as it is deposited by changing a composition of the precursor solution.

9. The method of claim 4, wherein adding the polymer binder comprises mixing a water emulsion of the polymer binder with the nanocrystals stream at a location that vaporizes the water.

10. The method of claim 9, further comprising controlling a temperature in the plasma chamber by adjusting a flow rate of the carbon containing gas mixture.

11. The method of claim 10, wherein the carbon containing gas mixture comprises a hydrocarbon.

* * * * *